428-1
8/3/76    XR    3,973,057    SR

United States Patent [19]
Channin et al.

[11] 3,973,057
[45] Aug. 3, 1976

[54] METHOD OF PREPARING A LIQUID CRYSTAL DISPLAY

[75] Inventors: Donald Jones Channin; Eldon Bruce Priestley, both of East Windsor, N.J.

[73] Assignee: RCA Corporation, New York, N.Y.

[22] Filed: Mar. 7, 1975

[21] Appl. No.: 556,426

[52] U.S. Cl.............. 427/162; 350/160 LC; 427/169; 427/354; 427/384; 427/387; 427/402; 427/430; 427/435; 428/1; 428/429; 428/447
[51] Int. Cl.² .............. C09K 3/34; G02F 1/13; B05D 1/18
[58] Field of Search............ 428/1, 429, 447; 350/160 LC; 427/162, 169, 402, 430 B, 435, 384, 387, 354

[56] References Cited
UNITED STATES PATENTS

| | | | |
|---|---|---|---|
| 3,307,967 | 3/1967 | Vanderbilt et al. | 427/9 |
| 3,341,399 | 9/1967 | Hazdra et al. | 427/384 |
| 3,728,008 | 4/1973 | Allan et al. | 428/1 |
| 3,854,793 | 12/1974 | Kahn | 428/1 |

*Primary Examiner*—Michael R. Lusignan
*Assistant Examiner*—William H. Schmidt
*Attorney, Agent, or Firm*—Glenn H. Bruestle; Birgit E. Morris

[57] ABSTRACT

The inner surfaces of a pair of substrates of a liquid crystal display are treated with a solution of a surfactant to provide a uniform stable alignment of the liquid crystal material confined between the inner surfaces. The inner surfaces are first wetted by the solution of the surfactant, a silane derivative, and the solution is then heated, while the inner surfaces are in contact with the solution, to a temperature between about 75°C and a temperature just below the boiling point of the solution.

4 Claims, No Drawings

METHOD OF PREPARING A LIQUID CRYSTAL DISPLAY

This invention relates to a method of preparing a liquid crystal display, and more particularly, to a method of depositing a surfactant on the inner surfaces of the liquid crystal display that confine a liquid crystal material. The novel method is particularly useful for providing a uniform stable alignment of a liquid crystal material in a liquid crystal display device.

In U.S. Pat. No. 3,728,008, for Liquid Crystal Display, a method of preparing a liquid crystal display is described wherein a silane derivative is chemisorbed on the interior surfaces of substrates of a liquid crystal display to eliminate cloudiness of the display and to increase contrast. The method of the patent involves submerging the siliceous and/or metallic surfaces of the substrates in an aqueous solution of an organosilane for about five minutes at room temperature. During this time it is reported that the hydrolyzed organosilane molecules chemically bond themselves to the substrate surfaces. Next, the substrates are thoroughly rinsed in distilled water to remove any excess organosilane and then dried. Air drying is adequate to get fully cured treatment, but heat can be used to speed up the curing process. It is believed that a layer of silane molecules is formed on the surfaces of the substrates, each silane molecule being individually bonded to the surface.

While the method described in the aforementioned patent is effective in many cases, we have found that the method is inadequate for producing good alignment of nematic liquid crystal materials in some combinations of liquid crystal materials and substrates. In particular, when the substrate is non-uniform in composition, as in an integrated circuit, or when it is rough or uneven, the method of the aforementioned patent fails to produce a uniform alignment over the entire substrate surface. Also, certain liquid crystal materials have resisted alignment on any surface, using the aforementioned method. The novel method of the present invention is an improvement over this prior-art method, and provides an excellent stable uniform alignment of liquid crystal materials in many display structures where the prior-art method was found lacking.

Briefly stated, the novel method of the present invention is an improvement in the method of preparing a liquid crystal display of the type wherein a layer of liquid crystal material is confined between the inner surfaces of a pair of substrates, and wherein the inner surfaces are first wetted by a solution of a silane derivative. An important feature of the novel method is the operation of heating the solution of the silane derivative while the inner surfaces of the substrates are wetted by, that is, in intimate contact with, the solution to a temperature of between about 75°C and a temperature just below the boiling point of the solution. The heating operation should be carried out for a period of between about 3 minutes and about 1 hour, depending upon the particular combination of the silane derivative and the substrates used. Next, the substrates are rinsed to remove excess solution, and then dried.

In one embodiment of the novel method, the inner surfaces of the substrates are non-metallic, and the solution of the silane derivative comprises, by volume, 0.1 to 1.0% of the silane derivative in water.

In another embodiment of the novel method, the inner surface of at least one of the substrates is a metal, and the solution of the silane derivative comprises, by volume 0.1 to 1.0% of the silane derivative, about 2.0% water, and about 0.1% acetic acid in acetone or dimethyformamide. The proportions, by volume, of these solutions are not critical, and they may vary by a few percent, depending upon the liquid crystal material and substrates used.

The novel method is applicable to liquid crystal display devices of the type wherein a layer of a liquid crystal material is confined between the inner surfaces of a pair of substrates, such as "NESA" glass (Trademark) or "NESATRON" glass (Trademark) (glass coated with an electrical conductor of indium oxide and/or tin oxide), for example. The liquid-crystal-confining inner surfaces of the substrates are prepared by treating them with a surfactant which is an organosilane derivative having the general formula $RnSiX_{4-n}$, where R is an organofunctional group that includes an alkyl group, X designates a hydrolyzable group attached to the silicon, and $n$ is an integer equal to 1, 2, or 3. The hydrolyzable group may be an alkoxy group, usually methoxy, ethoxy or a halogen. An organosilane compound, that is, a silane derivative, useful in the novel method, is Dow Corning XZ-2-2300, having the structure:

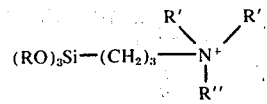

where R and R' are small alkyl groups of 1 or 2 carbons and R'' is a long alkyl chain of 16 to 18 carbons. Other similar surfactants, useful in the novel method, are Dow Corning QZ8-5479 and Z-4141.

In accordance with the novel method of the present invention, when the cleaned inner surfaces of a pair of substrates are siliceous, such as glass, or an oxide of indium, tin, or silicon, for example, they are prepared by first wetting them with a solution of a silane derivative, of the type described, for chemisorbing a film of the silane derivative to the inner surfaces. The solution of the silane derivative comprising, by volume, 0.1 to 1.0% of the silane derivative in water, is heated to a temperature of between 75°C and a temperature just below the boiling point of the solution. The heating operation is carried out for a period of between about 3 minutes and about 1 hour while the inner surfaces of the substrate are in intimate contact with the solution of the silane derivative. After the heating operation, the inner surfaces of the pair of substrates are rinsed in water, and dried. A liquid crystal cell is then formed with the substrates. In a typical liquid crystal cell the inner surfaces of a pair of substrates of a liquid crystal display device are spaced between about 0.5 and 1.0 mils (0.0125 and 0.025mm) apart.

Where at least one of the inner surfaces of the substrates is metallic, such as a layer of aluminum, for example, in a reflective liquid crystal display device, the cleaned inner surfaces are wetted with a solution of a silane derivative comprising, by volume, 0.1%–1.0% of a silane derivative, about 2.0% water, and about 0.1% acetic acid in acetone or dimethylformamide (DMF). The inner surfaces and the solution are heated to a temperature of between 75°C and a temperature just below the boiling point of the solution for a period of between about 3 minutes and about 1 hour, depending upon the particular combination of the silane derivative and the substrate being used. For example, silane derivative Dow Corning XZ-2-2300 appears to react more quickly than silane derivative Dow Corning Z-4141. The inner surfaces are next rinsed in water and then dried. The latter solution of a silane derivative is referred to as a "wet" non-aqueous solution because it contains only enough water to hydrolyze the silane derivative. Such a solution for metallic surfaces is preferable to the aqueous solution for silicious surfaces because the aqueous solution has a detrimental pitting effect on the metallic surface which is manifested in a lowering of the reflectivity of the metal.

Liquid crystal materials which gave improved results in liquid crystal cells when used in accordance with the novel method are:

1. MBBA N-(p'-methoxybenzylidine)-p-n-butylaniline

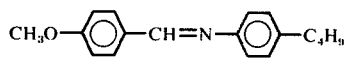

2. EBBA N-(p'-ethoxybenzylidene)-p-n-butylaniline
3. EDS-1 32 weight percent of MBBA in an equal weight mixture of APAPA-10, APAPA-12, and APAPA-13 where:

APAPA-10 is 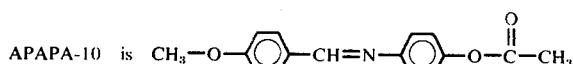

APAPA-12 is 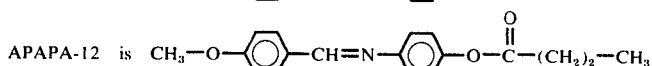

APAPA-13 is 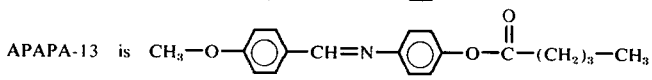

4. EM 50% MBBA and 50% EBBA, by weight
5. No. 11643 Eastman Kodak Dynamic Scattering Mixture. A proprietary mixture of MBBA and esters of the structure:

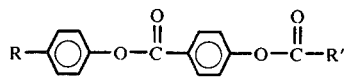

The instant method differs from the prior-art method disclosed in the aforementioned U.S. Pat. No. 3,728,008, by the addition of the heating operation of the inner surfaces of the substrates of the liquid crystal display device while these inner surfaces are in intimate contact with the solution of the silane derivative. We have observed that the instant method, using heat, produces an alignment of the liquid crystal materials much better and more stable in many liquid crystal display devices than when the heating operation is omitted. The mechanism by which the improvement is produced is not understood in detail, but it appears that the heating operation in the presence of the organosilane solution results in a more uniform and perhaps thicker surfactant layer than produced by the prior-art method.

This may be due to the thermally activated chemisorption of the organosilane on the surface, that takes place in the presence of excess organosilane. This is by way of contrast to the prior-art method wherein chemisorption of the silane derivative takes places at room temperature. In addition, the mechanism by which the improvement is produced may be due, in whole or in part, to a thermally activated polymerization that takes place in the presence of excess organosilane. The importance of excess organosilane in contact with the substrates during the heating operation is emphasized. The drying operation of the prior-art method takes place after all of the silane derivative has been thoroughly rinsed from the substrates and there is no opportunity for further chemisorption to occur.

The following examples give more detailed descriptions of effective methods of preparing displays according to the invention.

EXAMPLE 1

Two glass microscope slides were thoroughly cleaned by a cleaning procedure including (1) 5 minute ultrasonic cleaning with a detergent in water, (2) two rinses in water, (3) 5 minute boil in acetone, (4) 5 minute boil in methyl alcohol, and (5) 5 minute treatment in a vapor degreaser with ethyl alcohol. The glass slides were immersed in a solution of a silane derivative comprising, by volume, about 0.5% Dow Corning XE-2-2300 in water. The solution of the silane derivative with the glass slides in contact therewith was heated to a temperature just below the boiling point for about 10 minutes. Thereafter, the glass slides were removed from the silane derivative solution and dried. A liquid crystal cell was made from the two slides by spacing them about 0.0125mm apart and filling the space with liquid crystal material, Eastman Kodak Dynamic Scattering Mixture (Eastman organic chemical No. 11643). Viewing the liquid crystal cell under polarized light, showed a uniform alignment of the optic axis of the layer of liquid crystal material perpendicular to the inner surfaces of the cell.

A repetition of Example 1, excluded the operation of heating the glass slides while they were in contact with the solution of the silane derivative, and resulted in a poorer alignment of the liquid crystal material.

EXAMPLE 2

Two pieces of "NESATRON" glass (Trademark of Pittsburgh Plate Glass Co.) were cleaned and their inner oxide coated surfaces were treated as described in Example 1. Liquid crystal cells fabricated, using the liquid crystal material EM, exhibited a stable uniform alignment of the liquid crystal material in the cell. Similar NESATRON liquid crystal cells prepared in accordance with the teachings of the prior-art method exhibited poorer alignment of the liquid crystal material.

EXAMPLE 3

Example 2 was repeated using EDS-s1 as a liquid crystal material in the cell. Here, again, the liquid crystal material exhibited a uniform stable alignment. Similar liquid crystal material in a cell where the heating operation of the inner surfaces of the oxide coated glass was omitted, showed a relatively poorer alignment.

EXAMPLE 4

A silicon dioxide passivating layer on an integrated circuit was cleaned by boiling it for 5 minutes in trichloroethylene. The passivating silicon dioxide layer and a microscope cover glass were immersed in a solution of a silane derivative similar to the one used in Example 1, and the solution was heated to a temperature of about 75°C for about 10 minutes and then removed and dried. A layer of liquid crystal material, MBBA, was placed between the passivated silicon dioxide layer and the microscope cover glass, and good alignment of the liquid crystal material was observed with polarized light. Good alignment was achieved only occasionally with the prior-art method i.e., when the heating operation was omitted.

EXAMPLE 5

Four pieces of "NESATRON" glass were cleaned by (1) immersing them in a commercial glass cleaner, "Chromerge" (Trademark), for 30 seconds, (2) immersing them in an ultrasonic bath of ammonium hydroxide for 5 minutes, (3) rinsing them in hot distilled water for 4 minutes, (4) rinsing them in an ultrasonic bath of acetone for 5 minutes, (5) rinsing them in ultrasonic bath of methanol for 5 minutes and (6) heating them in air for 30 minutes to drive off solvents. The glass was next immersed in a silane derivative solution, Dow Corning QZ8-5479, and heated to a temperature of about 100°C for 15 minutes. The silane derivative solution comprised about 0.5% by volume silane derivative in water. After the heating operation, the glass plates were rinsed in deionized water, blown dry by nitrogen gas and baked at about 105°C for about 1 hour. Two liquid crystal cells each spaced about 0.0125mm apart were filled with the liquid crystal material MBBA. Good alignment of the liquid crystal material was obtained in each of the liquid crystal cells.

Example 5 was repeated with four pieces of "NESATRON" glass but the heating operation was omitted. Two liquid crystal cells were constructed, as in the Example 6, and filled with a liquid crystal material MBBA. No alignment of the liquid crystal material was obtained in either of the liquid crystal cells.

EXAMPLE 6

A liquid crystal cell of the type comprising one glass plate having an inner coating of aluminum thereon, and a second glass plate having an inner surface coated with a conductive transparent material, such as indium oxide and/or tin oxide was provided. The liquid crystal cell was flushed with methanol and blown dry with dry nitrogen. The cell was filled with an aqueous solution of Dow Corning XZ-2-2300. The solution of the silane derivative comprised, by volume, about 0.5% silane derivative in water. The cell, while in contact with the solution of the silane derivative, was heated to about 90°C for about 10 minutes. Next, the cell was flushed with water, blown dry with dry nitrogen gas, and baked at a temperature of 110°C for about ½ hour. When filled with the liquid crystal material EM and observed under polarized light, good alignment of the liquid crystal material was observed. The same results were obtained with the liquid crystal material EDS-1. It was observed that the aqueous solution of the silane derivative used in this example caused an etching (pitting) of the aluminum coating in the liquid crystal cell. Using a "wet" non aqueous solution of a silane derivative cured this defect, as described in the next example.

EXAMPLE 7

The procedure of Example 6 was repeated with the exception that the silane derivative solution was made up of about 0.5%, by volume, of silane derivative, about 2% water, about 0.1% acetic acid in acetone. Good alignment was observed with the liquid crystal materials EM and EDS-1, and no detrimental effects were noted on the aluminum coating of the liquid crystal cell. Relatively poor alignment of the liquid crystal materials resulted when the heating step was omitted. Dimethylformamide (DMF) can be substituted for acetone in the aforementioned solution of the silane derivative.

EXAMPLE 8

Twelve pieces of "NESATRON" glass were cleaned by (1) immersing in "Chromerge" (Trademark) for 2 minutes, (2) immersing in an ultrasonic bath of ammonium hydroxide for 10 minutes, and (3) rinsing in hot distilled water for 4 minutes. The glass was dried in air for 30 minutes and stored in air in a covered container for 24 hours. Four pieces of the glass were immersed in a silane derivative solution, Dow Corning Z-4141 for 20 minutes at room temperature. Four pieces of the glass were immersed in the solution and heated to a temperature of about 100°C for 20 minutes. The remaining four pieces of glass were immersed in the solution and heated to a temperature of about 100°C for 1 hour. The solution of silane derivative comprised about 1.0% Dow Corning Z-4141 in water. Next, the glass was rinsed in deionized water, blown dry by nitrogen gas, and baked at about 105°C, for about ½ hour Two liquid crystal cells were made from each of the three sets of four pieces of glass. The inner surfaces of the glass in each cell were spaced about 0.0125mm apart and filled with the liquid crystal material EM. Liquid crystal cells made from the four pieces of glass that were not heated in the solution of the silane derivative did not align the liquid crystal material EM well. Substantial improvement in the alignment was evident in the cells fabricated from the glass pieces that had been heated for 20 minutes while in contact with the silane derivative solution. The alignment in the cells fabricated from the glass pieces that had been heated for 1 hour while in contact with the silane derivative solution exhibited perfect alignment as evidenced by the lack of any visible defects when viewed between crossed polarizers.

The aforementioned examples of the novel method are presented merely for illustrative purposes, and none of the values given are critical. For example, the percentage of silane derivative in an aqueous solution may vary between about 0.1 and about 1%; and the heating operation may be carried out for between about 3 minutes and about 1 hour at a temperature of between about 75°C and just below the boiling point of the silane derivative solution. The boiling point of the silane derivative solution will depend upon the particular silane derivative used, and will be slightly higher than the boiling point of water.

Liquid crystal cells made in accordance with the novel method and indistinguishable from liquid crystal cells made by prior-art methods; but the former are superior to the latter in that some liquid crystal materials which align themselves poorly in cells treated by the prior-art methods give good alignment in cells treated by the instant novel method. Consequently, the only way that an improved liquid crystal cell can be distinguished from prior-art liquid crystal cells is knowing that the liquid crystal cell was made by the novel method wherein the inner surfaces of the cell that confine the liquid crystal material were heated while in contact with a silane derivative.

What is claimed is:

1. A method of preparing a liquid crystal cell comprising a layer of difficultly alignable liquid crystal material between two spaced apart siliceous plates which comprises immersing said plates in a solution containing a silane derivative of the formula $R_nSiX_{4-n}$ wherein R is an organofunctional group which includes an alkyl, X is a hydrolyzable group attached to the silicon and $n$ is an integer of 1–3 and water, heating said solution while said plates are immersed therein to a temperature between about 75°C. and a temperature just below the boiling point of said solution for at least 3 minutes, removing excess silane solution from said plates, drying said plates, and filling said cell with said liquid crystal material.

2. A method according to claim 1 wherein said silane solution comprises 0.1 to 1.0% of said silane derivative in water.

3. A method according to claim 1 wherein one of said plates has a metallic inner surface and said silane solution comprises about 0.1 to 1.0% by volume of said silane derivative, about 2.0% by volume of water, and about 0.1% of acetic acid in acetone or dimethylformamide.

4. A method according to claim 1 wherein said silane has the formula

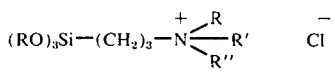

wherein R and R' are alkyl groups of 1–2 carbon atoms and R'' is an alkyl group of 16–18 carbon atoms.

* * * * *